Figure 1:
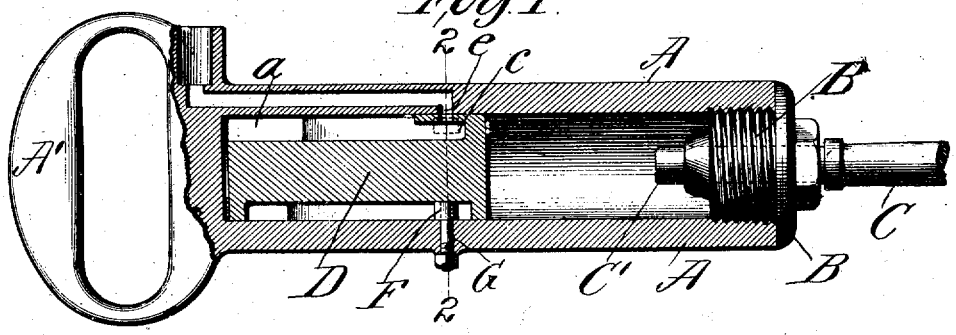

No. 11,887. Reissued Jan. 29, 1901.

A. C. BECKWITH.

PNEUMATIC HAMMER.

(Application filed Mar. 16, 1900.)

Attest:
Wm. H. Fox
Ralph Talisch.

Inventor:
Arthur C. Beckwith
by Bakewell & Cornwall
Attys.

UNITED STATES PATENT OFFICE.

ARTHUR C. BECKWITH, OF CHICAGO, ILLINOIS, ASSIGNOR TO THE MISSOURI RAILWAY EQUIPMENT COMPANY, OF ST. LOUIS, MISSOURI.

PNEUMATIC HAMMER.

SPECIFICATION forming part of Reissued Letters Patent No. 11,887, dated January 29, 1901.

Original No. 559,660, dated May 5, 1896. Application for reissue filed March 16, 1900. Serial No. 9,006.

*To all whom it may concern:*

Be it known that I, ARTHUR C. BECKWITH, a citizen of the United States, residing in the city of Chicago, Cook county, Illinois, have invented a certain new and useful Improvement in Pneumatic Hammers, of which the following is a full, clear, and exact description, such as will enable others skilled in the art to which it appertains to make and use the same, reference being had to the accompanying drawings, forming part of this specification.

This invention relates to a new and useful improvement in hammers of that class in which motive fluid, preferably in the form of compressed air, is admitted to the engine through a flexible supply-hose. The engine is designed to be held in the hands of the operator, and the chisel or other like tool, which is loosely inserted in the front end thereof and upon which the piston delivers impacting blows, is guided in its work.

The engine illustrated in the accompanying drawings is of that type known as "valveless"—that is, no separately-movable valve is provided for the piston, but the piston acts as its own valve—effecting the alternate admission and exhaust of the motive fluid at opposite ends. Heretofore valveless tools have been made; but those with which I am familiar were objectionable, in that they communicated shocks or jars to the operator because the piston was not properly cushioned. As is well known, the backward movement of the piston should be accomplished with the least possible expenditure of power, first, because there is no external work done; second, because the piston is being reset or restored to a position to do its work, (deliver its blow on the end of the chisel,) and, third, because a great pressure in front of the piston will cause it to strike the head of the engine at the extreme of its rearward movement, imparting a shock or jar to the operator; also, with respect to the forward movement of the piston the pressure should be shut off therebehind, so that said piston will travel on expansion or by momentum before it strikes its blow, and when striking its blow the pressure therebehind will have been exhausted, so that the blow will be yielding or rebounding, as distinguished from a heavy "dead" blow resulting from the uninterrupted admission of pressure behind the piston up to the time the blow is struck.

The object of my present invention is to produce a pneumatic hammer of the valveless type which embodies in its construction the advantageous features to which I have briefly referred above and which is also cheap, simple, and durable.

The invention consists principally of a cylinder provided with a bearing for a chisel or other tool, the cylinder having a motive agent, inlet-port and exhaust-ports, and a piston fitted to slide and to turn in the said cylinder and adapted to strike the said tool, the piston being provided with channels and ports adapted to register alternately with the inlet-port and one of the said exhaust-ports. The port arrangements of my improved engine are of prime importance, in that by introducing impulses behind and in front of the piston about the time it reaches the extremity of its movements I cushion the same and also initially admit pressure, which when the piston is in its rearmost position starts it forward and when said piston is in its foremost position renders it sensitive to the extent that it delivers a quick rebounding blow. The cushioning of the piston on its rearward movement makes the engine non-vibrating, which is very desirable, and the rebounding blow resulting from the impulse admitted when the piston is in a forward position adds to the efficiency of the engine.

The invention also consists of certain parts and details and combinations of the same, as will be fully described hereinafter and then pointed out in the claims.

Reference is to be had to the accompanying drawings, forming a part of this specification, in which similar characters of reference indicate corresponding parts in all the views.

Figure 2:
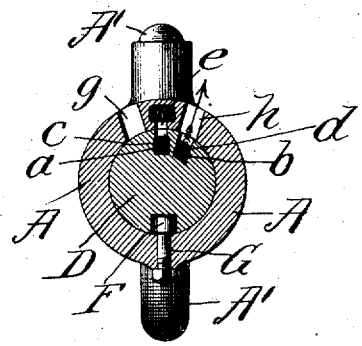
Figure 3:
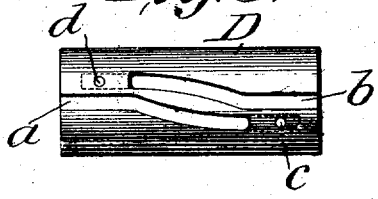
Figure 4:
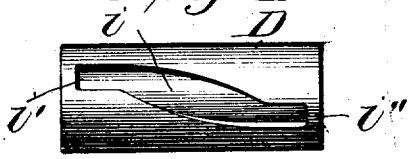

Figure 1 is a longitudinal sectional view of my improved hammer. Fig. 2 is a transverse section of the same on line 2 2 of Fig. 1. Fig. 3 is a plan view of the piston, and Fig. 4 is an inverted plan view of the same.

In the drawings, A indicates the cylinder, on the rear end of which is arranged a handle A′, as usual.

B indicates a plug forming in part the front end wall of the cylinder, said plug also serving as a support or guide for the chisel-shank C′ of a chisel or other tool C, adapted to receive the impacting blows of the piston. This chisel is so introduced in the support B that it can slide freely.

D indicates the piston, formed on one side, which I will term the "top," with open ports *a* and *b*, which might be termed "grooves," and closed or blind ports *c* and *d*. The groove *a* opens at the rear end of the piston and for some distance is substantially parallel with the axis thereof, when it assumes a curved line terminating at the blind or closed port *c*.

I use the term "blind or closed port" to designate an opening wholly surrounded by material in distinguishment from the open groove-ports. The groove-port *b* opens at the forward end of the piston and extends rearwardly some distance in a straight line, beyond which the port *b* curves reversely and terminates at its rear end in a closed or blind port *d*.

*e* indicates an inlet-port leading into the bore of the cylinder and through which motive fluid is supplied to the engine by means of a flexible pipe connected to some suitable source of supply.

*g* and *h* (see Fig. 2) are exhaust-ports arranged on each side of the inlet-port *e*.

On the opposite side of piston D is formed a spiral groove *i*, terminating in the straight ends *i′* and *i″*, circumferentially displaced with relation to each other, as shown in Fig. 4. This groove is provided with oppositely-curved walls between the straight ends, so that the groove is widest at its middle portion and narrows toward each of the straight ends *i′* and *i″*.

F indicates a friction-roller designed to operate in the groove *i′*, said friction-roller being mounted on the end of a bolt G, fixed in the cylinder, as shown in Figs. 1 and 2.

Before entering into a description of the operation of the engine I will call attention to the fact that the blind ports *c* and *d* are approximately in spiral alinement with the curved opening-ports *b* and *a*, respectively, and, further, that the circumferential displacement of the blind ports *c* and *d* with respect to each other corresponds to the circumferential displacement of the straight ends *i′* and *i″* of the groove *i*.

When the several parts are in the position illustrated in Fig. 1, the blind port *c* registers with the inlet-port *e*, and through the groove *a* pressure is admitted behind the piston for a short period of time, after which port *c* passes out of registration with the inlet-port *e*, and the piston travels on expansion until the open port *a* registers with the inlet-port *e*, when the motive fluid is uninterruptedly admitted behind the piston for such time as the roller F forces the piston to rotate to continue the registration of the inlet-port *e* with the curved portion of the groove *a*. As the piston moves forwardly it reaches a point approximately at the rear end of the groove-port *a*, where the piston, continuing its rotation, causes the inlet-port *e* to pass out of registration with the groove *a* and into registration with the blind port *d*. During the forward movement of the piston up to this point the pressure in front of said piston has been uninterruptedly exhausted through the groove *b* and the exhaust-port *h*, and coincidently with the passing out of registration of port *e* with respect to port *a* port *b* passes out of registration with the exhaust-port *h*. There is an instant of time when the piston occupies a "lap" position—that is, none of its ports are in registration with either the inlet or exhaust ports of the cylinder—and it is during this instant that reversal of port arrangements take place, so that it may be said with respect to the piston after emerging from this lap position it travels forward by momentum. Port *a* opens the exhaust for the pressure behind the piston through exhaust-port *g*, and at the time that the piston delivers its impacting blow upon the end of the chisel-shank an impulse of motive fluid is admitted through the blind port *d* and the port *b*, which materially assists in causing the piston to deliver a quick rebounding blow. Under this impulse the piston is initially started on its rearward movement, and after the blind port *d* passes out of registration with the inlet-port *e* pressure is admitted in front of the piston through the port *b* until the roller F, coöperating with the other wall of the spiral cam-groove, establishes a lap position, before referred to, during which time the port arrangements just described are reversed. The impulse admitted behind the piston when in its rearmost position serves to cushion the same and initially start it forward, which results in rendering the tool non-vibrating with respect to the operator holding it. The chisel-shank sliding freely in the bearing B will absorb the blow delivered thereagainst by the piston and not transmit the blow to the cylinder.

The oppositely-curved walls of the cam-groove with which the roller F coöperates were heretofore described as being most widely separated about midway the length of the piston. The purpose of this is to permit the piston to travel at the beginning of its movement in either direction for some distance before rotation commences, the major part of the rotary movement of the piston occurring near the end of its movement, while at the end of its movement the piston vibrates in a straight line, the return movement continuing in a straight line for a considerable distance until reversed rotation commences again. By this arrangement I am enabled to have two piston-ports, each serving as inlet and exhaust ports alternately, and these two ports coöperate with one fixed inlet and two fixed exhaust ports arranged on each side of said inlet-port.

It will be obvious from the above description that the presence of the chisel in the front end wall of the cylinder is necessary to the operation of the engine, or rather a solid end wall is necessary, and in the construction shown in the drawings the chisel effects the closure of the opening in the block, and thus completes or forms the solid end wall referred to. This construction is desirable, in that when the chisel is removed from working position the engine will automatically cease to operate, thus saving the piston from the liability of hammering itself against the ends of the cylinder and also saving the operator the annoyance of being compelled to handle the active machine when said machine is doing no work. The removal of the chisel from the front end of the cylinder establishes communication between the space in front of the piston and the external atmosphere, so that the piston may move forward; but when it is rotated, so that the port arrangements are such that under normal conditions the piston would travel rearwardly by reason of the admission of motive fluid in front thereof, said motive fluid under these new conditions (when the chisel is absent) will blow through the opening in the front end wall of the cylinder formerly occupied by the chisel.

It will be noticed, further, in connection with the construction shown in the drawings that the length of the cam-groove *i* is such that when the chisel is absent the roller F, fitting in the straight end *i'* of the piston, centers said piston with respect to the inlet-port *e*, so that the blowing through before referred to is effected through the blind port *d* and the groove-port *b*. If now the engine is held in its most natural position under the circumstances—that is, suspended from the hand of the operator, with its nose pointing downward—the length of the cam-groove *i* will permit the piston to sink by gravity until the roller F strikes the end wall of the cam-groove at the rear end of the piston, at which time the blind port *d* will have passed out of registration with the inlet-port *e*, thus shutting off the motive fluid and preventing the same from blowing through when the piston occupies this abnormal forward position. From the construction shown it will be seen that as the chisel-shank C' extends some distance into the bore of the cylinder its absence will give ample room for the piston to move to this abnormal forward position, as above described.

I am aware that minor changes in the construction, arrangement, and combination may be made and substituted for those herein shown and described without in the least departing from the nature and principle of my invention.

Having thus described my invention, what I claim, and desire to secure by Letters Patent, is—

1. The combination with a cylinder having inlet and exhaust ports, of a piston having spiral grooves on its periphery for coöperating with said ports, and means for turning said piston during reciprocation to cause said groove to pass into or out of registration with said cylinder-ports, said grooves being so located and arranged that the piston in its movement receives an initial impulse and then an uninterrupted supply of motive fluid; substantially as described.

2. The combination with a cylinder having inlet and exhaust ports located about midway its length, of a piston having spiral peripheral grooves, and means for causing said piston to turn or oscillate during reciprocation, whereby its peripheral grooves are alternately thrown into and out of registration with said cylinder-ports, to admit and exhaust pressure at each end of said piston, said grooves being so located and arranged that the piston in its movement receives an initial impulse and then an uninterrupted supply of motive fluid; substantially as described.

3. The combination with a cylinder provided with an inlet-port and two exhaust-ports arranged on each side of said inlet-port, said ports being located about midway the length of the cylinder, of a piston provided with peripheral grooves *a* and *b*, opening at opposite ends of the piston, said piston being also provided with a spiral cam-groove, and a roller arranged on the cylinder and extending into said cam-groove, said grooves being so located and arranged that the piston in its movement receives an initial impulse and then an uninterrupted supply of motive fluid; substantially as described.

4. The combination with a cylinder provided with an inlet-port, of a piston provided with a plurality of ports coöperating with the cylinder inlet-port in such manner that, in its forward movement, the piston receives an initial impulse and then an uninterrupted supply of motive fluid therebehind; substantially as described.

5. The combination with a cylinder provided with an inlet-port, of a piston provided with a plurality of ports to coöperate with the cylinder inlet-port in such manner that, in its rearward movement, the piston receives an initial impulse and then an uninterrupted supply of motive fluid; substantially as described.

6. The combination with a cylinder having an inlet-port *e* and exhaust-ports *g* and *h*, of a piston having peripheral grooves *a* and *b*, and blind ports *c* and *d*, communicating with the grooves *a* and *b* respectively, and means for turning said piston during its reciprocations, whereby, in its forward movement said piston receives an initial impulse and then an uninterrupted supply of motive fluid, until nearing the limit of its forward movement, at which time the motive fluid is cut off from behind the piston and, when striking its blow, the piston receives an initial impulse in front thereof, and then an uninterrupted supply of motive fluid until it nearly completes its rearward movement; substantially as described.

7. The combination with a cylinder provided with inlet and exhaust ports, and a piston provided with blind and open ports coöperating with the cylinder-ports, whereby, as the piston approaches the limit of its forward and backward movements, it receives impulses which serve to cushion said piston and initially start it on its return movement; substantially as described.

8. A pneumatic hammer provided at its front end with a tool-receiving bore opening into the front end of the piston-chamber, and adapted to be received and closed by the shank of the removable working tool, the piston having a passage for admitting motive fluid to the front end of the piston-chamber, whereby the shank of the working tool is made to form a part of the end wall of the piston-chamber against which the motive fluid acts to force the piston rearward; substantially as described.

9. In a pneumatic hammer having a piston-chamber in its front end which is partially closed by an annular shoulder surrounding an opening adapted to receive the shank of the chisel, the piston of said hammer having a passage for admitting the motive fluid in front thereof, whereby the shank of the tool is made to form part of the end wall of the cylinder against which the motive fluid acts to force the piston rearward; substantially as described.

10. A pneumatic hammer having a piston-chamber whose front end is partially closed by an annular shoulder surrounding an opening adapted to receive the shank of a removable chisel, so that said chisel forms part of the end wall of the piston-chamber against which the motive fluid acts to force the piston rearward, in combination with a piston provided with a passage for admitting motive fluid in front thereof, and means coöperating with said piston to partially rotate the same in the cylinder, whereby the motive fluid is admitted to said passage at the proper time, the absence of the chisel from its designed position rendering the device inoperative; substantially as described.

11. In a pneumatic hammer the combination with a piston, and a chisel acted upon by said piston, of means controlled by said chisel for automatically throwing the machine out of operation when said chisel is removed from its working position, and for causing it to resume normal operation when said tool is restored to its working position, said piston being provided with suitable ports or passages opening at opposite ends thereof respectively, and a cam-groove, and a roller coöperating with said cam-groove to partially rotate the piston for admitting and exhausting pressure to the ends thereof; substantially as described.

In testimony whereof I hereunto affix my signature, in the presence of two witnesses, this 6th day of February, 1900.

ARTHUR C. BECKWITH.

Witnesses:
R. S. MITCHELL,
JOHN EVANS.